(12) United States Patent
Uchida

(10) Patent No.: US 7,733,442 B2
(45) Date of Patent: Jun. 8, 2010

(54) DISPLAY DEVICE AND ELECTRONIC APPARATUS

(75) Inventor: Masami Uchida, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 12/409,885

(22) Filed: Mar. 24, 2009

(65) Prior Publication Data

US 2009/0185259 A1 Jul. 23, 2009

Related U.S. Application Data

(62) Division of application No. 11/531,415, filed on Sep. 13, 2006, now Pat. No. 7,528,903.

(30) Foreign Application Priority Data

Oct. 14, 2005 (JP) ............................ 2005-299838
Jun. 8, 2006 (JP) ............................ 2006-159799

(51) Int. Cl.
*G02F 1/133* (2006.01)
*G02F 1/1333* (2006.01)
*G02F 1/1339* (2006.01)

(52) U.S. Cl. ............................ 349/86; 349/56; 349/84; 349/87; 349/88; 349/89; 349/90; 349/91; 349/92; 349/93; 349/94; 349/116; 349/122; 349/138; 349/155; 349/156; 349/157

(58) Field of Classification Search .................. 349/56, 349/84, 86–94, 116, 122, 138, 155–157
See application file for complete search history.

(56) References Cited

U.S. PATENT DOCUMENTS

| 6,525,799 | B1 | 2/2003 | Fukuda |
| 6,650,384 | B2 * | 11/2003 | Oguchi et al. .................. 349/86 |
| 2004/0027327 | A1 | 2/2004 | LeCain et al. |
| 2004/0135764 | A1 | 7/2004 | Takeda |

FOREIGN PATENT DOCUMENTS

| JP | 09-185087 | 7/1997 |
| JP | 10-048657 | 2/1998 |
| JP | 10048657 A * | 2/1998 |

OTHER PUBLICATIONS

Communication from European Patent Office regarding counterpart application (Feb. 16, 2007).

* cited by examiner

*Primary Examiner*—Frank G Font
*Assistant Examiner*—Jerry Blevins
(74) *Attorney, Agent, or Firm*—Harness, Dickey & Pierce, P.L.C.

(57) ABSTRACT

A display device includes a first substrate, a second substrate, and microcapsules sandwiched between the first substrate and the second substrate, the microcapsules constituting a display area, the microcapsules encapsulating a display material whose optical properties change in response to electrical stimulation. A conductive material for conducting between the substrates is provided between the first substrate and the second substrate to constitute a vertically conducting portion. The thickness of the conductive material is set such that the distance between the first substrate and the second substrate at the vertically conducting portion is larger than the distance between the first substrate and the second substrate in the display area.

4 Claims, 5 Drawing Sheets

DISPLAY DEVICE AND ELECTRONIC APPARATUS

CROSS REFERENCE TO RELATED APPLICATIONS

This application is a divisional patent application of U.S. Ser. No. 11/531,415 filed Sep. 13, 2006, claiming priority to Japanese Patent Application Nos. 2005-299838 filed Oct. 14, 2005 and 2006-159799 filed Jun. 8, 2006, all of which are incorporated by reference.

BACKGROUND

1. Technical Field

The present invention relates to a display device provided with microcapsules and an electronic apparatus including the display device.

2. Related Art

Hitherto, electrophoretic display devices, each of which includes an electrophoretic dispersion liquid containing a liquid-phase dispersion medium and electrophoretic particles and utilizes the phenomenon in that the distribution state of the electrophoretic particles changes in the presence of an applied electric field, thus changing the optical properties of the electrophoretic dispersion liquid, have been known (for example, refer to Japanese Unexamined Patent Application Publication No. 9-185087 [Patent Document 1]). In such electrophoretic display devices, since a backlight is not required, the cost can be reduced and the thickness can be decreased. Moreover, the electrophoretic display devices provide a wide angle of view and a high contrast, and also have memory effects in terms of display. Therefore, the electrophoretic display devices have been receiving attention as a next-generation display device.

Furthermore, in a known electrophoretic display device, an electrophoretic dispersion liquid is encapsulated in microcapsules, and the microcapsules are sandwiched, for example, between a transparent substrate provided with a transparent electrode which serves as a common electrode and a substrate provided with pixel electrodes. Encapsulation of the electrophoretic dispersion liquid in microcapsules is advantageous in that it is possible to prevent the dispersion liquid from flowing out during the fabrication process of the display device, and it is possible to decrease sedimentation and aggregation of the electrophoretic particles.

In such an electrophoretic display device provided with microcapsules, as a method for providing conduction between the transparent electrode and the substrate, a technique of using a conductive material including a resin and conductive particles incorporated therein is generally employed. As the conductive material, a conductive paste including a resin, such as epoxy, and conductive particles, such as metal particles, e.g., silver, or carbon particles, are incorporated therein, or a conductive sheet produced by forming the conductive paste into a sheet is known.

When conduction is achieved between the substrates using such a conductive material, in order to prevent the occurrence of color irregularity and the like, the thickness (height) of the conductive material is set so that the distance between the substrates in the display area composed of the microcapsules is the same as the distance between the substrates at a vertically conducting portion which is conducted by the conductive material, and the vertically conducting portion is formed.

However, in the display device having the structure described above, when reliability tests, such as a high-temperature preservation test and a temperature cycling test, are performed, in some cases, separation may occur between the transparent substrate or the substrate and the conductive material due to thermal expansion and thermal shrinkage of the resin in the conductive material, resulting in defective continuity. When defective continuity occurs in such reliability tests, it is expected that long-term reliability may not be ensured when the product is in the market. Therefore, it has been strongly demanded to take measures against the problems.

SUMMARY

An advantage of the invention is that it provides a display device in which occurrence of defective continuity resulting from separation between a substrate and a conductive material is prevented and long-term reliability is ensured, and an electronic apparatus including the display device.

According to an aspect of the invention, a display device includes a first substrate, a second substrate, and microcapsules sandwiched between the first substrate and the second substrate, the microcapsules constituting a display area, the microcapsules encapsulating a display material whose optical properties change in response to electrical stimulation, wherein a conductive material for conducting between the substrates is provided between the first substrate and the second substrate to constitute a vertically conducting portion, and wherein the thickness of the conductive material is set such that the distance between the first substrate and the second substrate at the vertically conducting portion is larger than the distance between the first substrate and the second substrate in the display area.

In the display device, the thickness of the conductive material is set such that the distance between the first substrate and the second substrate at the vertically conducting portion is larger than the distance between the first substrate and the second substrate in the display area. Thus, the first substrate and/or the second substrate are/is warped outward at the vertically conducting portion and elastically deformed with respect to the display area. Consequently, the first substrate and/or the second substrate, due to the resilience thereof, exert/exerts force that acts inward, i.e., force that presses the conductive material side, in particular at the vertically conducting portion. Since the first substrate and/or the second substrate always press/presses the conductive material side in such a manner, for example, even if a reliability test, such as a high-temperature preservation test or a temperature cycling test, is performed, separation between the first substrate or the second substrate and the conductive material is prevented, and thus long-term reliability as a product is ensured.

In the display device, preferably, the thickness of the conductive material is set such that the distance between the first substrate and the second substrate at the vertically conducting portion is larger than the distance between the first substrate and the second substrate in the display area by a range of 10 to 200 μm. If the difference of the distance between the substrates at the vertically conducting portion is less than 10 μm, the pressing force due to the resilience toward the conductive material is decreased, and there is a possibility that separation may occur in the reliability test. If the difference exceeds 200 μm, there is a possibility that, because of the change with time for a long period of time, the microcapsules lying in the vicinity of the vertically conducting portion may be separated from the substrates, resulting in defective display. Consequently, by specifying the range of 10 to 200 μm, both long-term reliability on defective continuity and long-term reliability on defective display can be ensured.

Furthermore, in the display device, preferably, the vertically conducting portion is disposed at the perimeter of each of the first substrate and the second substrate. In such a manner, since the resilience acts more strongly, the force that presses the conductive material side is more satisfactorily exerted.

Furthermore, in the display device, preferably, an adhesive layer which bonds the first substrate to the second substrate is provided between the first substrate and the second substrate at a position different from that of the vertically conducting portion and from that of the display area. In such a manner, the first substrate and the second substrate are bonded to each other more strongly, and thus separation between each substrate and the conductive material can be prevented.

Furthermore, in the display device, preferably, a substrate electrode is disposed on one of the first substrate and the second substrate at a position including the vertically conducting portion, and the adhesive layer is provided on the substrate electrode excluding a position at which the vertically conducting portion is disposed. In such a manner, in particular bonding between the substrate electrode and the conductive material can be reinforced by the adhesive layer.

Furthermore, in the display device, preferably, the adhesive layer is provided between the microcapsules and the vertically conducting portion. In such a manner, the first substrate and the second substrate are bonded to each other more strongly, and also bonding in the vicinity of the vertically conducting portion becomes stronger, thus preventing separation of the vertically conducting portion from the first substrate or the second substrate.

Furthermore, in the display device, preferably, the microcapsules are bonded to the first substrate or the second substrate, and an adhesive of the adhesive layer is the same as an adhesive for bonding the microcapsules to the first substrate or the second substrate. In such a manner, the step of forming the adhesive layer can be carried out simultaneously with the step of sandwiching the microcapsules, thus being advantageous in terms of the production process.

Furthermore, preferably, the microcapsules are bonded to the first substrate or the second substrate with an adhesive sheet having a thickness of 25 μm or more, and the adhesive of the adhesive layer is formed by a portion of the adhesive sheet protruded out toward the vertically conducting portion. By using the adhesive sheet with a thickness of 25 μm or more and heating the adhesive sheet, the adhesive sheet is softened, and a portion thereof protrudes out toward the vertically conducting portion. The adhesive sheet is hardened in such a state to constitute the adhesive layer. Consequently, the adhesive layer can be formed without adding a new processing step, thus being extremely advantageous in terms of the production process.

Furthermore, in the display device, preferably, the adhesive layer is composed of a moisture-resistant resin, and the adhesive layer is disposed outside the vertically conducting portion and the display area so as to surround the vertically conducting portion and the display area. In such a manner, it is possible to prevent corrosion of the electrode due to damp (moisture), degradation of the microcapsules, and the like.

According to another aspect of the invention, an electronic apparatus includes the display device described above. Since the electronic apparatus includes the display device in which long-term reliability is ensured, the electronic apparatus itself has also ensured long-term reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
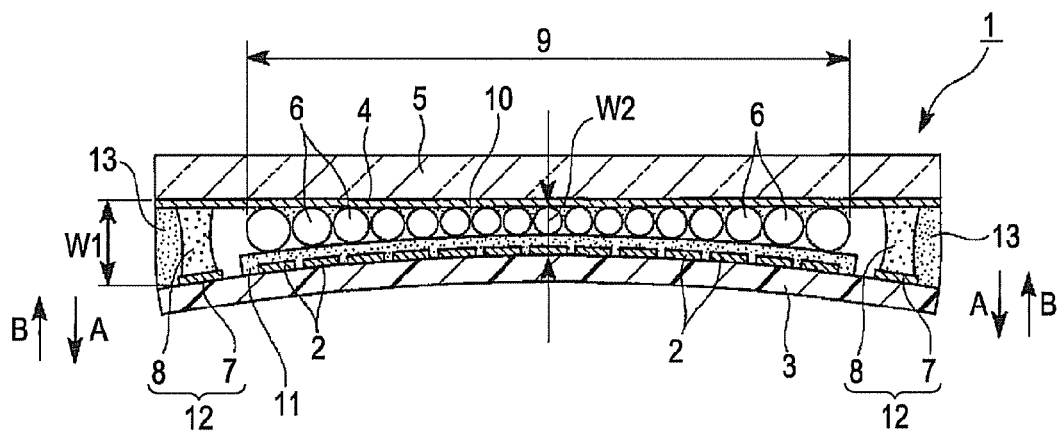
FIG. 1 is a sectional side elevation showing a schematic structure of a display device according to an embodiment of the invention.

The invention will be described in detail below. FIG. 1 is a schematic diagram showing a display device according to an embodiment of the invention. In FIG. 1, reference numeral 1 represents a display device. Note that, in FIGS. 1 and 4A to 4D, in order to facilitate understanding of the characteristic parts of the invention, the device is schematically shown with the size and shape being extremely changed from the actual size and shape. In particular, although microcapsules in the center and microcapsules at both ends are shown to have different diameters, all the microcapsules are actually formed so as to have substantially the same diameter.

The display device 1 includes a first substrate 3 provided with a plurality of pixel electrodes 2 and a second substrate 5 provided with a common electrode (counter electrode) 4. Microcapsules 6 encapsulating a display material are sandwiched between the first substrate 3 and the second substrate 5. Such a display device 1 can be designed so as to have one display surface (view surface) or two display surfaces (view surfaces). The substrate and electrode on the display surface side must have high light transmission properties, and in particular, are preferably transparent. In this embodiment, as will be described below, the second substrate 5 is a transparent substrate and the common electrode 4 is a transparent electrode. Thus, the second substrate 5 side is a display surface.

Many pixel electrodes 2 are disposed on the inner surface of the first substrate 3, and also wiring formed by a copper foil pattern or the like (not shown), which is connected to the pixel electrodes 2, is disposed thereon. Furthermore, substrate electrodes 7 are disposed outside the pixel electrodes 3 at the perimeter of the first substrate 3. The substrate electrodes 7 are each electrically connected to an external power source, for example, through a flexible printed circuit board (FPC), and electrically connected to the second substrate 5 through a conductive material 8.

As each of the first substrate 3 and the second substrate 5, a rectangular, film-shaped or sheet-shaped resin substrate is used in particular when the display device 1 is used for an IC card, electronic paper, or the like that is required to have flexibility. Furthermore, as the second substrate 5 which serves as a display surface (view surface) as described above, a transparent substrate (having high light transmission properties) is used as described above. As the material for such a transparent substrate (second substrate 5), for example, polyethylene terephthalate (PET), polyethersulfone (PES), or polycarbonate (PC) is preferably used.

With respect to the first substrate 3, which does not serve as a display surface, since transparency (high light transmission properties) is not required, in addition to the materials described above, polyesters, such as polyimide (PI) and polyethylene naphthalate (PEN), polyethylene (PE), polystyrene (PS), polypropylene (PP), polyetheretherketone (PEEK), acrylates or polyacrylates, and the like can also be used. Furthermore, when the display device is not required to have flexibility as in the case of the general panel, glass, hard resins, and semiconductor substrates composed of silicon or the like can also be used.

However, in the invention, as will be described below, a structure is employed in which at least one of the first substrate 3 and the second substrate 5 is elastically deformed and resilience is exerted in that state, and thus at least one of the first substrate 3 and the second substrate 5 must be an elastically deformable, flexible substrate. The material, thickness, etc. are appropriately selected for use in order to provide such properties.

Figure 2:
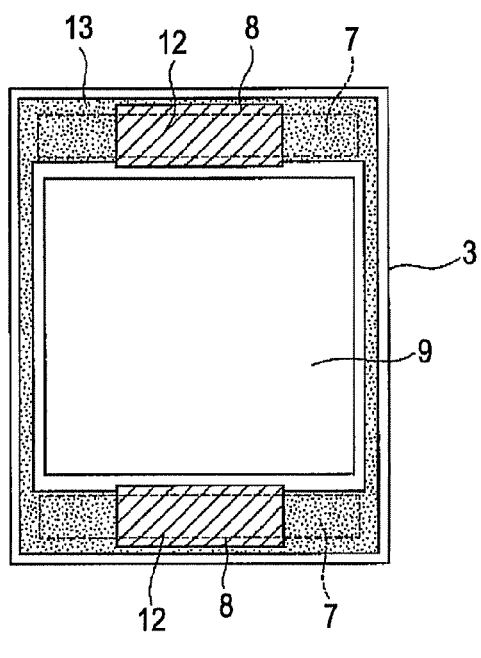
FIG. 2 is a plan view showing an interior side of a first substrate.

In this embodiment, as the first substrate 3, a polyimide substrate with a thickness of 25 μm is used, and thus the first substrate 3 has flexibility and is elastically deformable and resilient. As shown in FIG. 2, a pair of substrate electrodes 7 are disposed on the inner surface of the polyimide substrate (first substrate 3) at the perimeter of the substrate, and pixel electrodes (not shown) are disposed between the substrate electrodes 7. A display area 9, which will be described below, is formed corresponding to the group of pixel electrodes. The substrate electrodes 7 are each composed of a copper foil pattern with a thickness of 10 to 20 μm, for example, formed by a semiadditive method.

As shown in FIG. 1, the pixel electrodes 2 may be formed by a copper foil pattern in the same step as that of forming the substrate electrodes 7, or may be formed using a general conductive material, such as aluminum (Al) separately from the formation of the substrate electrodes 7. Many pixel electrodes 2 are disposed in accordance with the predetermined pixel shape, such as a rectangular shape, that is designed in advance.

In this embodiment, as the second substrate 5, a transparent substrate composed of polyethylene terephthalate (PET) with a thickness of 200 μm is used. As described above, the transparent electrode as the common electrode 4 is disposed on the inner surface of the transparent substrate (second substrate 5). The transparent electrode (common electrode 4) is formed over the entire inner surface of the second substrate 5, and is composed of a conductive oxide, such as indium-tin oxide (ITO), an electronically conductive polymer, such as polyaniline, an ionically conductive polymer prepared by dispersing an ionic substance, such as NaCl, $LiClO_4$, or KCl, in a matrix resin, such as a polyvinyl alcohol resin or a polycarbonate resin, or the like. In this embodiment, the transparent electrode (common electrode 4) is composed of an ITO film formed by vapor deposition or the like.

Microcapsules 6 are disposed, in particular, on the pixel electrodes 2 between the first substrate 3 and the second substrate 5 having the structures described above. Thus, the microcapsules 6 constitute the display area 9 shown in FIG. 2. As described above, the microcapsules 6 encapsulate a display material, and all the microcapsules 6 are formed with substantially the same diameter. In this embodiment, the diameter is about 30 μm. The optical properties of the display material encapsulated change in response to electrical stimulation. Specifically, the display material is mainly composed of electrophoretic particles or a liquid crystal.

As the material mainly composed of electrophoretic particles, an electrophoretic dispersion liquid including electrophoretic particles and a liquid-phase dispersion medium for dispersing the electrophoretic particles is used. Examples of the liquid-phase dispersion medium include water; alcohol solvents, such as methanol, ethanol, isopropanol, butanol, octanol, and methyl cellosolve; esters, such as ethyl acetate and butyl acetate; ketones, such as acetone, methyl ethyl ketone, and methyl isobutyl ketone; aliphatic hydrocarbons, such as pentane, hexane, and octane; alicyclic hydrocarbons, such as cyclohexane and methylcyclohexane; aromatic hydrocarbons, such as benzene, toluene, xylene, and long-chain alkyl group-containing benzenes, e.g., hexylbenzene, heptylbenzene, octylbenzene, nonylbenzene, decylbenzene, undecylbenzene, dodecylbenzene, tridecylbenzene, and tetradecylbenzene; halogenated hydrocarbons, such as methylene chloride, chloroform, carbon tetrachloride, and 1,2-dichloroethane; carboxylate salts; and various types of oil. These liquid-phase dispersion media may be used alone or in combination together with a surfactant or the like.

The electrophoretic particles are organic or inorganic particles (polymer or colloid) which move by electrophoresis caused by the potential difference in the liquid-phase dispersion medium. Examples of the electrophoretic particles include black pigments, such as aniline black, carbon black, and titanium black; white pigments, such as titanium dioxide, zinc oxide, and antimony trioxide; yellow pigments, such as isoindolinone, chrome yellow, yellow iron oxide, cadmium yellow, titanium yellow, and antimony; azo pigments, such as monoazo, disazo, and polyazo; red pigments, such as quinacridone red and chrome vermillion; blue pigments, such as phthalocyanine blue, indanthrene blue, anthraquinone dyes, Prussian blue, ultramarine blue, and cobalt blue; and green pigments, such as phthalocyanine green. These pigments may be used alone or in combination of two or more.

Furthermore, as necessary, these pigments can be incorporated with an electrolyte, a surfactant, a charge controlling agent composed of particles of a metal soap, a resin, rubber, oil, varnish, a compound, or the like, a dispersing agent, such as a titanium coupling agent, an aluminum coupling agent, or a silane coupling agent, a lubricant, a stabilizer, or the like. As a material for forming the wall membrane of the microcapsules 6, a gum arabic-gelatin composite membrane, or a compound, such as a urethane resin or a urea resin, can be used.

In the display device 1 of this example, two types of electrophoretic particles are encapsulated in the microcapsules 6. The particles of one type are negatively charged, and the particles of the other type are positively charged. As the two types of electrophoretic particles, for example, titanium dioxide, which is a white pigment, and carbon black, which is a black pigment, are used. By using such white and black electrophoretic particles, for example, when numbers and the like are displayed, the numbers and the like can be displayed by the black electrophoretic particles. Alternatively, display may be performed by using only one type of electrophoretic particles and subjecting the particles to electrophoresis toward the common electrode 4 or the pixel electrodes 2.

Furthermore, the microcapsules 6 are fixed, in particular, on the common electrode 4 of the second substrate 5 with a binder 10. As the binder 10, any material that has good affinity for the wall membrane of the microcapsule 6, excellent adhesion to the common electrode 4, and insulating properties can be used. Examples thereof include polyethylene, chlorinated polyethylene, ethylene-vinyl acetate copolymers, ethylene-ethyl acrylate copolymers, polypropylene, ABS resins, methyl methacrylate resins, vinyl chloride resins, vinyl chloride-vinyl acetate copolymers, vinyl chloride-vinylidene chloride copolymers, vinyl chloride-acrylate copolymers, vinyl chloride-methacrylic acid copolymers, vinyl chloride-acrylonitrile copolymers, ethylene-vinyl alcohol-vinyl chloride copolymers, propylene-vinyl chloride copolymers, vinylidene chloride resins, vinyl acetate resins, polyvinyl alcohol, polyvinyl formal, thermoplastic resins, such as cellulosic resins, polyamide resins, polymers, such as polyacetal, polycarbonate, polyethylene terephthalate, polybutylene terephthalate, polyphenylene oxide, polysulfone, polyamide-imide, polyaminobis-maleimide, polyethersulfone, polyphenylene sulfone, polyarylate, grafted polyphenylene ether, polyetheretherketone, and polyether imide, fluorocarbon resins, such as polytetrafluoroethylene, polyfluoroethylenepropylene, tetrafluoroethylene-perfluoroalkoxyethylene copolymers, ethylene-tetrafluoroethylene copolymers, polyvinylidene fluoride, polytrifluoroethylene chloride, and fluororubber, and silicon resins, such as silicone resins and silicone rubber. Other examples include methacrylic acid-styrene copolymers, polybutylene, and methyl methacrylate-butadiene-styrene copolymers.

The microcapsules 6 are fixed on the pixel electrodes 2 of the first substrate 3 by a double-faced adhesive sheet 11. The double-faced adhesive sheet 11 has a thickness of about 25 µm and is composed of rubber, an acrylic resin, or the like having adhesion. The double-faced adhesive sheet 11 is bonded to the pixel electrodes 2 of the first substrate 3 and bonded to the microcapsules 6, thus holding the microcapsules 6 on the first substrate 3. By such a structure, the microcapsules 6 are sandwiched between the first substrate 3 and the second substrate 5 to constitute the display area 9.

The substrate electrodes 7 are disposed outside the display area 9 as shown in FIG. 2, and a conductive material 8 is disposed on the substrate electrodes 7. The conductive material 8 together with each substrate electrode 7 constitutes a vertically conducting portion 12 which conducts between the first substrate 3 and the second substrate 5. The conductive material 8 is composed of a resin and conductive particles incorporated therein. That is, the conductive material 8 is composed of a conductive paste prepared by mixing conductive particles into a resin, such as an epoxy resin, the conductive particles formed by subjecting cores composed of metal particles, such as silver or nickel particles formed by crushing, carbon particles, or a resin, to nickel-plating and gold-plating, or a conductive sheet produced by forming the conductive paste into a sheet. In particular, with respect to the resin, as a resin having adhesion at normal temperature, the rubber or the acrylic resin used for the double-faced adhesive sheet 11 is also preferably used.

Here, with respect to the thickness of the conductive material 8 which, together with the substrate electrode 7, constitutes the vertically conducting portion 12, the thickness of the conductive material 8 is set such that the distance W1 between the first substrate 3 and the second substrate 5 at the vertically conducting portion 12 is larger than the distance W2 between the first substrate 3 and the second substrate 5 in the display area. That is, the distance W1 between the first substrate 3 and the second substrate 5 at the vertically conducting portion 12 is substantially equal to the total thickness of the substrate electrode 7, the conductive material 8, and the common electrode 4, and the distance W2 between the first substrate 3 and the second substrate 5 in the display area is substantially equal to the total of the thickness of the pixel electrode 2 and the double-faced adhesive sheet 11, the thickness of the microcapsules 6 and the binder 10, and the thickness of the common electrode 4. Consequently, by setting the thickness of the conductive material 8 larger than the total of the diameter of the microcapsule 6 and the thickness of the double-faced adhesive sheet 11, the distance W1 can be set larger than the distance W2.

By setting the distance W1 between the substrates at the vertically conducting portion 12 larger than the distance W2 between the substrates in the display area 9 in such a manner, as shown in FIG. 1, the vertically conducting portion 12 sides, i.e., outer ends, of the first substrate 3, which has a particularly small thickness, are elastically deformed (warped) outward in a direction indicated by arrow A in FIG. 1. As a result, the first substrate 3, due to the resilience thereof, exerts force that acts inward as indicated by arrow B in FIG. 1, i.e., force that presses the conductive material 8 side.

Here, the largeness of the distance W1 with respect to the distance W2, i.e., the difference between the distance W1 and the distance W2, is preferably in the range of 10 to 200 µm, and particularly preferably in the range of 50 to 80 µm. If the difference is less than 10 µm, the pressing force due to the resilience toward the conductive material 8 is decreased, and there is a possibility that separation may occur in the reliability test. If the difference exceeds 200 µm, there is a possibility that, because of the change with time for a long period of time, the microcapsules 6 lying in the vicinity of the vertically conducting portion may be separated from the substrate 3(5), resulting in defective display. Consequently, by designing the thickness of the conductive material 8 such that the difference between the distance W1 and the distance W2 is in the range of 10 to 200 µm, both long-term reliability on defective continuity and long-term reliability on defective display can be ensured. In particular, by specifying the range of 50 to 80 µm, the long-term reliability can be more satisfactorily ensured.

There may be a case where a plurality of vertically conducting portions 12 are present, and consequently, variation occurs in the distance W1 between the substrates at these vertically conducting portions 12. In such a case, the average of a plurality of distances W1 is considered as the distance W1 between the substrates at the vertically conducting portion 12 in the invention. As shown in FIG. 1, variation also occurs in the distance W2 between the substrates in the display area 9. With respect to the distance W2, the minimum value of a plurality of distances W2 is considered as the distance W2 between the substrates in the display area 9.

As shown in FIG. 2, the conductive material 8 constituting the vertically conducting portion 12 is not disposed over the entire surface of each substrate electrode 7 and is disposed on a part of the upper surface of the substrate electrode 7. Consequently, a region in which the substrate electrode 7 and the conductive material 8 are stacked corresponds to the vertically conducting portion 12 in the invention. The adhesive layer 13 is disposed on the substrate electrode 7 at a position not provided with the conductive material 18 and in the vicinity thereof. As described above, the adhesive layer 13 is disposed at a position different from that of the vertically conducting portion 12 and also from that of the display area 9. By disposing the adhesive layer 13 between the first substrate 3 and (the common electrode 4 of) the second substrate 5, the first substrate 3 and the second substrate 5 are fixed to each other and the substrates are bonded to each other more strongly.

In particular, when the adhesive layer 13 is composed of a resin that has stronger adhesion than that of the conductive material 8, since the adhesive layer 13 is provided on the substrate electrode 7, adhesion between the substrate electrode 7 and the conductive material 8 is reinforced, and separation therebetween is prevented. Furthermore, when the adhesive layer 13 is composed of a moisture-resistant resin, in particular, by disposing the adhesive layer 13 in the vicinity of the substrate electrode 7 outside the vertically conducting portion 12 and the display area 9 so as to surround the vertically conducting portion 12 and the display area 9, it is possible to prevent corrosion of the electrode due to damp (moisture), degradation of the microcapsules, and the like. As the moisture-resistant resin, a resin having high crosslinking density, such as an epoxy resin, is used.

Figure 3:
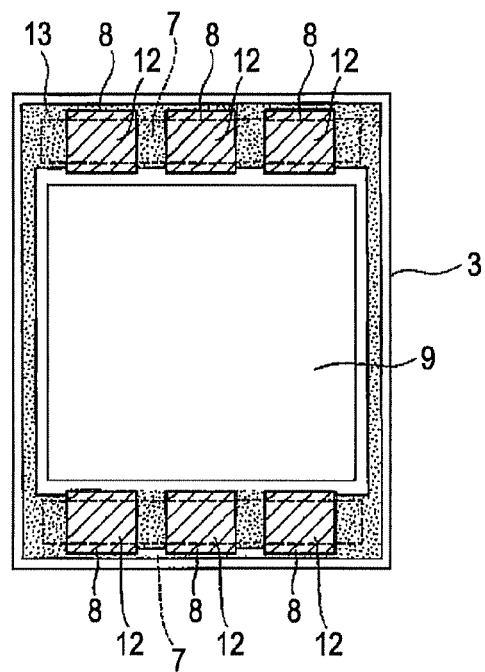
FIG. 3 is a plan view showing an interior side of a first substrate.

In FIG. 2, the conductive material 8 is disposed on the substrate electrode 7 at one position, and one vertically conducting portion 12 is formed on one substrate electrode 7. However, as shown in FIG. 3, the conductive material 8 may be disposed on the substrate electrode 7 at a plurality of (e.g., three) positions, and a plurality of vertically conducting portions 12 may be formed on one substrate electrode 7. In such a case, by disposing the adhesive layer 13 between the plurality of portions of the conductive material 8, as described above, bonding between the substrate electrode 7 and the conductive material 8 can be reinforced, and separation therebetween can be prevented.

Figure 4A:
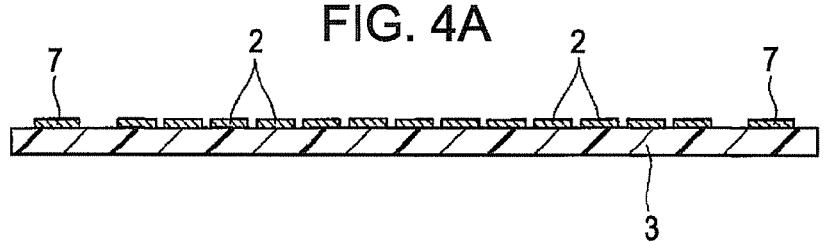
FIGS. 4A to 4D are schematic diagrams used for describing a method for fabricating a display device step by step.
Figure 4B:
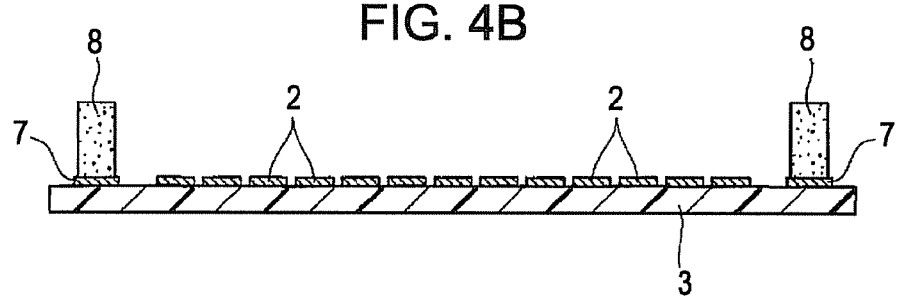

In order to fabricate a display device 1 having the structure described above, first, as shown in FIG. 4A, a first substrate 3 composed of an elastically deformable polyimide with a thickness of about 25 µm is prepared, and substrate electrodes 7 and pixel electrodes 2 are formed thereon by a known method, such as the semiadditive method. Subsequently, as shown in FIG. 4B, the conductive sheet described above, as a conductive material 8, is disposed at a predetermined position of each substrate electrode 7 and bonded thereto. The thickness of the conductive sheet, serving as the conductive material 8, is set as a predetermined thickness such that the distance W1 is larger than the distance W2 in FIG. 1 as described above.

Furthermore, separately, as a second substrate 5, a transparent substrate composed of polyethylene terephthalate (PET) is prepared, and a transparent electrode (common electrode 4) composed of ITO is formed over one surface (inner surface) thereof by vapor deposition or the like. Then, many microcapsules 6 are bonded to a predetermined position on the common electrode 4 of the second substrate 5, i.e., the position corresponding to the display area 9, using a binder 10. Subsequently, a double-faced adhesive sheet 11 is bonded to a side opposite to the second substrate 5 side of the microcapsules 6.

Figure 4C:
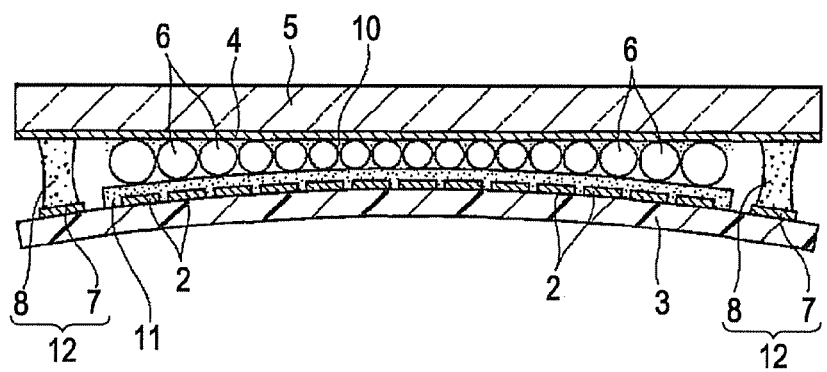

Subsequently, the second substrate 5 to which the double-faced adhesive sheet 11 has been thus bonded is disposed on the first substrate 3 so as to face the first substrate 3. Then, as shown in FIG. 4C, the double-faced adhesive sheet 11 of the second substrate 5 is pressed against the surface of the first substrate 3 provided with the pixel electrodes 2 and the double-faced adhesive sheet 11 is bonded thereto. Simultaneously, the common electrode 4 of the second substrate 5 is pressed against the conductive material 8 on the first substrate 3, and bonding therebetween is performed. Thus, the first substrate 3 and the second substrate 5 are integrated with the conductive material 8, the double-faced adhesive sheet 11, and the like therebetween, and the microcapsules 6 are sandwiched between the first substrate 3 and the second substrate 5. Note that bonding of the double-faced adhesive sheet 11 and fixing by the conductive material 8 are basically performed at normal temperature without heating, and as necessary, heating is performed within a range that does not adversely affect the microcapsules 6.

By integrating the first substrate 3 and the second substrate 5 in such a manner, the distance W1 between the first substrate 3 and the second substrate 5 at the vertically conducting portion 12 becomes larger than the distance W2 between the first substrate 3 and the second substrate 5 in the display area 9. As a result, as shown in FIG. 4C, the perimeter of the first substrate 3 is elastically deformed (warped) outward, and resilience acts in a direction opposite to the direction of elastic deformation.

Figure 4D:
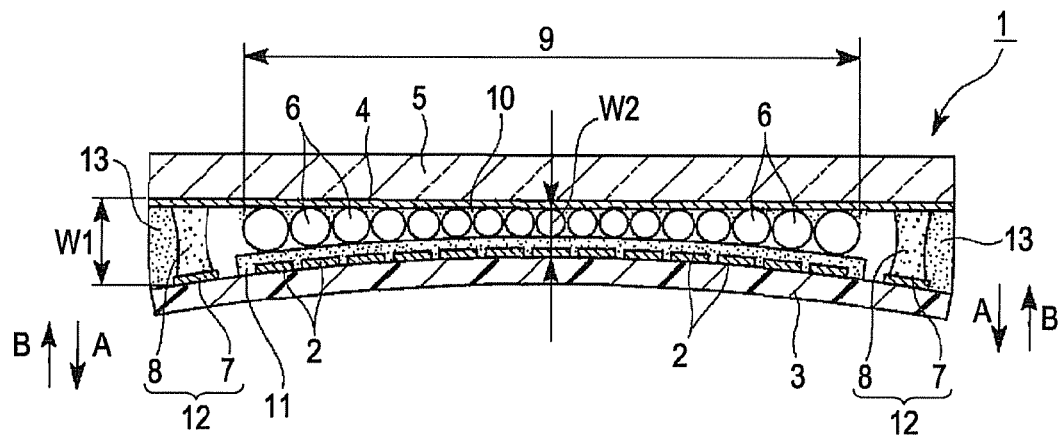

Subsequently, an adhesive is injected into the space between the first substrate 3 and the second substrate 5 from the perimeter side with a dispenser or the like to dispose the adhesive at a portion in which the conductive material 8 is not disposed on the substrate electrode 7 and its vicinity, i.e., as shown in FIG. 4D, at a position surrounding the conductive portion 12 and the display area 9. Then, by curing the adhesive, an adhesive layer 13 is formed, and a display device 1 is thereby obtained. As the adhesive, a UV-curing type adhesive or the like that is cured without heating is used. However, as in the bonding treatment of the double-faced adhesive sheet 11 or the like, it is also possible to use an adhesive that is cured by heating within a range that does not adversely affect the microcapsules 6.

In the display device 1 thus obtained, the vertically conducting portion 12 is formed by setting the thickness of the conductive material 8 such that the distance W1 between the substrates at the vertically conducting portion 12 is larger than the distance between the substrates in the display area 9. Thus, as described above, the first substrate 3, due to the resilience thereof, exerts force that presses the conductive material 18 side as indicated by arrow B in FIG. 1 in particular, at the vertically conducting portion 12. Since the first substrate 3 presses the conductive material 8 side in such a manner, for example, even if a reliability test, such as a high-temperature preservation test or a temperature cycling test, is performed, separation between the first substrate 3 or the second substrate 5 and the conductive material 8 is prevented, and thus long-term reliability as a product is ensured.

Figure 5:
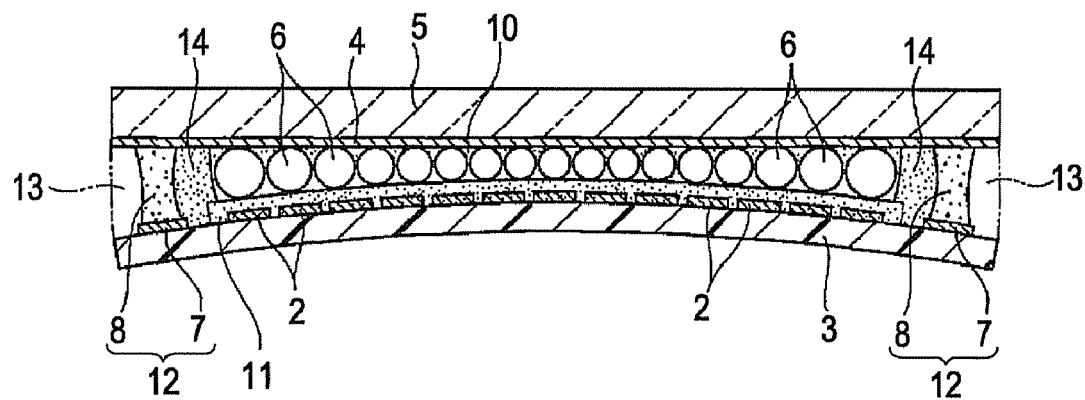
FIG. 5 is a schematic structural diagram used for describing a display device according to another embodiment of the invention.

The invention is not limited to the embodiment described above. It is to be understood that various alterations may be made to the embodiment without departing from the spirit and scope of the invention. For example, in the fabrication process of the display device 1, when the double-faced adhesive sheet 11 is bonded to a side of the microcapsules 6 bonded to the second substrate 5 opposite to the second substrate 5 side, as the double-faced adhesive sheet 11, a double-faced adhesive sheet having a thickness of 25 µm or more may be used. When such a double-faced adhesive sheet 11 is used and the double-faced adhesive sheet 11 is pressed against the surface of the first substrate 3 provided with the pixel electrodes 2 for bonding and fixing, for example, by heating at a temperature of 50° C. or higher (the temperature within a range that does not adversely affect the microcapsules 6), the double-faced adhesive sheet 11 is softened and a part thereof is allowed to protrude out toward the vertically conducting portion 12. Subsequently, curing is performed in that state. Thus, the portion allowed to protrude out between the microcapsules 6 and the vertically conducting portion 12 is used as an adhesive layer 14 as shown in FIG. 5.

Subsequently, as in the case shown in FIG. 4D, an adhesive is injected into the space between the first substrate 3 and the second substrate 5 from the perimeter side with a dispenser or the like, and the adhesive is cured to form an adhesive layer 13. Thereby, a display device is obtained.

In such a display device, the same advantageous effect as that in the display device 1 is obtained. In addition, bonding between the first substrate 3 and the second substrate 5 is stronger, and bonding in the vicinity of the vertically conducting portion 12 is stronger. Thus, separation of the vertically conducting portion 12 from the first substrate 3 or the second substrate 5 can be reliably prevented. Furthermore, since the adhesive layer 14 is formed using the double-faced adhesive sheet 11 simultaneously with the step of sandwiching the microcapsules between the first substrate 3 and the second substrate 5, the adhesive layer 14 can be formed without an additional step, thus facilitating the fabrication process.

Furthermore, in the embodiment described above, the first substrate 3 provided with the pixel electrodes 2 is elastically deformed outward by setting the thickness of the first substrate 3 smaller than that of the second substrate 5 provided with the common electrode 4 or the like. However, the second substrate 5 may be designed to be resilient. Alternatively, by designing the first substrate 3 and the second substrate 5 so as to have the same strength, both substrates may be elastically deformed to allow each substrate to exert resilience. Furthermore, in the embodiment, a case in which one display area is present has been described. The invention is also applicable to a case in which a plurality of display areas are each independently formed like an island.

Electronic apparatuses according to some embodiments of the invention will now be described below. The electronic apparatuses according to the embodiments of the invention each include the display device according to the embodiment of the invention described above. Examples of the electronic apparatus including the display device will be described below.

Mobile Computer

Figure 6:
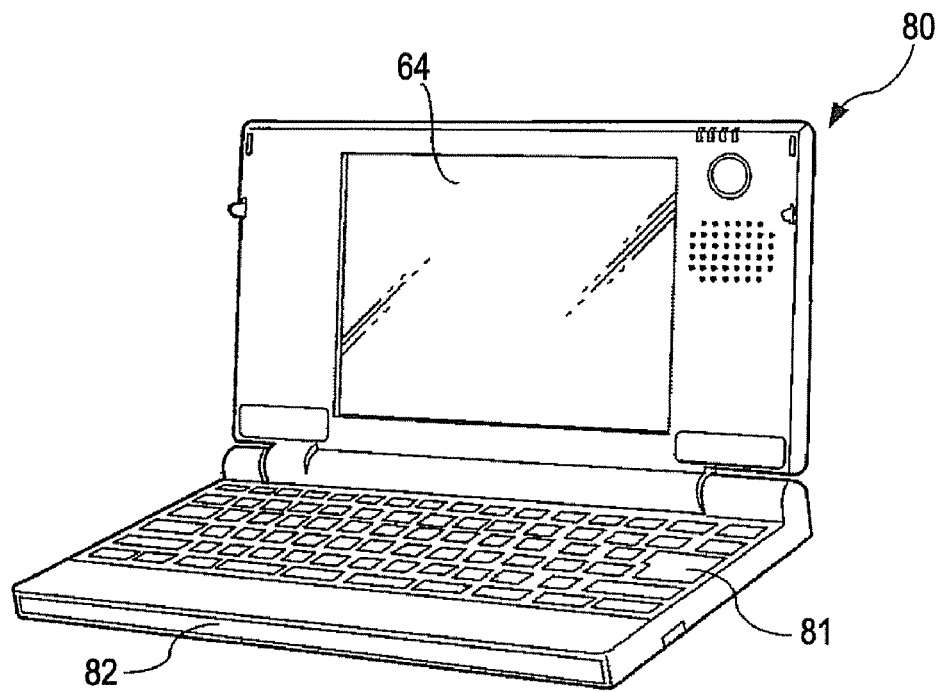
FIG. 6 is a perspective view showing an external structure of a computer, which is an example of the electronic apparatus of the invention.

First, an example in which the display device is applied to a mobile personal computer will be described. FIG. 6 is a perspective view showing a structure of the personal computer. As shown in FIG. 6, a personal computer 80 includes a main body 82 provided with a keyboard 81 and a display unit provided with the display device 64.

Mobile Phone

Figure 7:
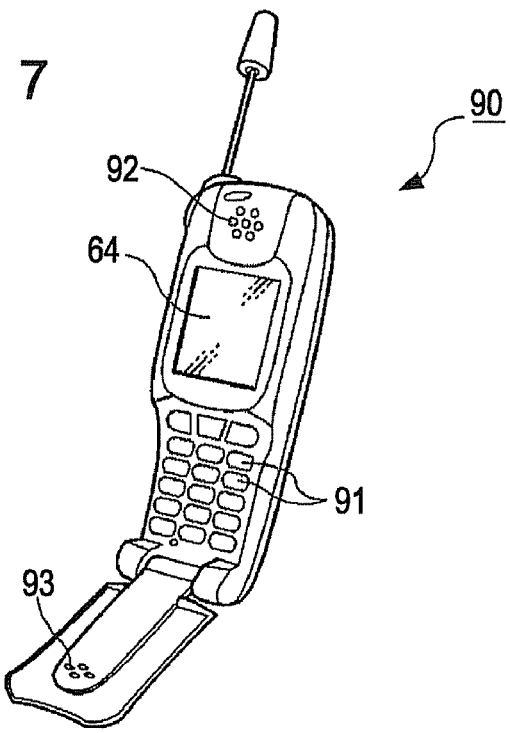
FIG. 7 is a perspective view showing an external structure of a mobile phone, which is an example of the electronic apparatus of the invention.

Next, an example in which the display device is applied to a display of a mobile phone will be described. FIG. 7 is a perspective view showing a structure of the mobile phone. As shown in FIG. 7, a mobile phone 90 includes a plurality of operation buttons 91, an earpiece 92, a mouthpiece 93, and the display device 64.

Electronic Paper

Figure 8:
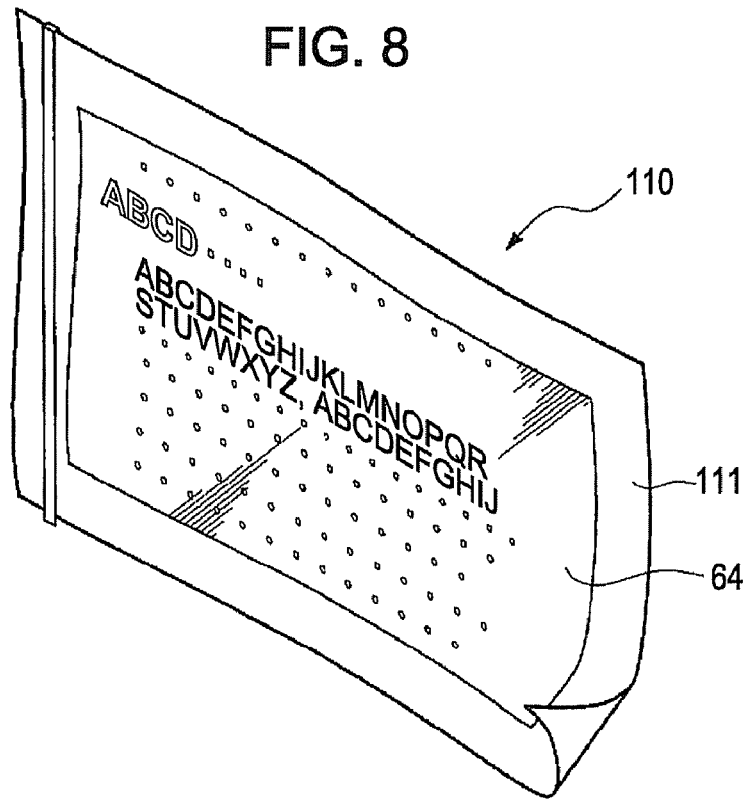
FIG. 8 is a perspective view showing an external structure of a sheet of electronic paper, which is an example of the electronic apparatus of the invention.

Next, an example in which the display device is applied to a display of electronic paper will be described. FIG. 8 is a perspective view showing a structure of the electronic paper. Electronic paper 110 includes a main body 111 composed of a rewritable sheet having texture like paper and flexibility and a display unit provided with the display device 64.

Electronic Notebook

Figure 9:
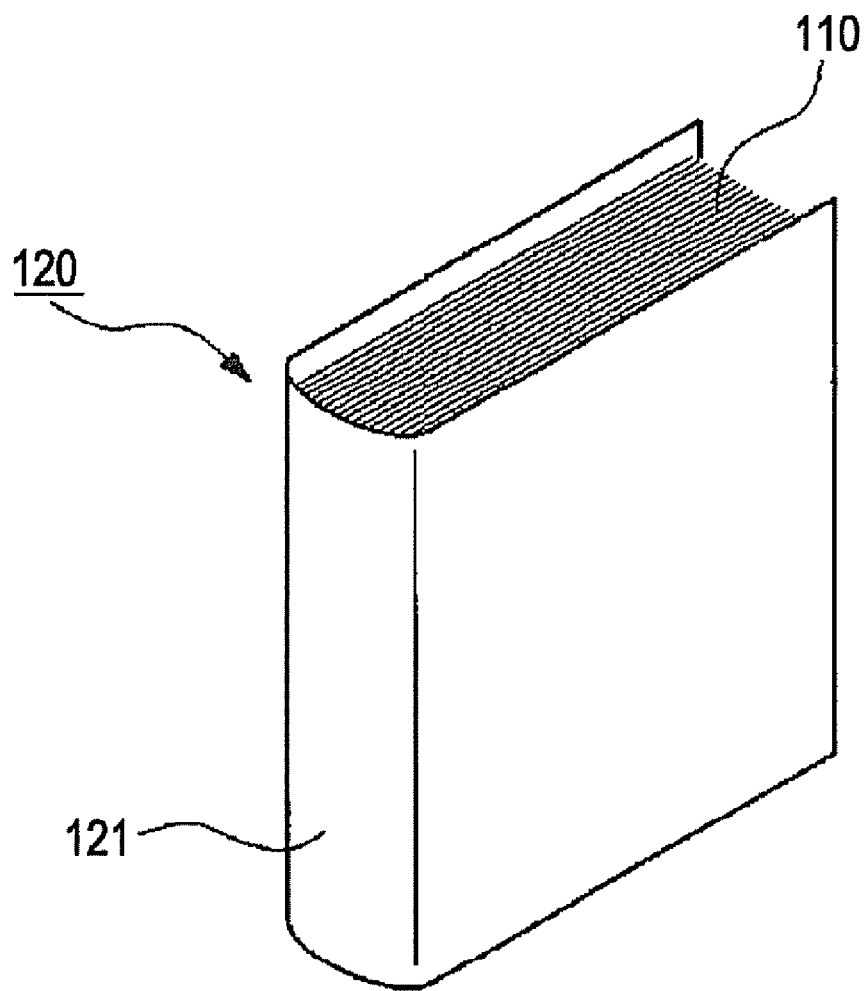
FIG. 9 is a perspective view showing an external structure of an electronic notebook, which is an example of the electronic apparatus of the invention.

FIG. 9 is a perspective view showing a structure of an electronic notebook. As shown in FIG. 9, an electronic notebook 120 includes a plurality of sheets of electronic paper 110 shown in FIG. 8, which are bundled together and covered with a cover 121. By providing a display data input unit on the cover 121, the display content of the electronic paper can be changed in the bundled state.

According to the electronic apparatuses described above, since the display device in which long-term reliability is ensured is provided, the electronic apparatuses each itself have also ensured long-term reliability.

Examples of the electronic apparatus include, in addition to the personal computer shown in FIG. 6, the mobile phone shown in FIG. 7, the electronic paper shown in FIG. 8, and the electronic notebook shown in FIG. 9, IC cards each including a display provided with the display device, a fingerprint detection sensor, and the like, electronic books, viewfinder type or monitor-direct-view type video tape recorders, car navigation systems, pagers, electronic pocket diaries, desktop electronic calculators, word processors, workstations, television telephones, POS terminals, and apparatuses provided with touch panels. Of course, the display device can be used as a display for each of the various types of electronic apparatuses.

What is claimed is:

1. A display device comprising:
a first substrate;
a second substrate;
a first adhesive layer disposed on the first substrate;
microcapsules disposed between the first adhesive layer and the second substrate, the microcapsules constituting a display area, the microcapsules encapsulating electrophoretic particles;
a conductive material for conducting between the substrates that is disposed between the first substrate and the second substrate to constitute a vertically conducting portion, the conductive material being disposed at a position different from that of the microcapsules and from that of the first adhesive layer; and
a second adhesive layer which bonds the first substrate to the second substrate, a second adhesive layer being provided between the first substrate and the second substrate, the second adhesive layer being disposed outside the vertically conducting portion and the display area so as to surround the vertically conducting portion and the display area,
wherein the thickness of the conductive material is larger than the total of the thickness of the microcapsule and the thickness of the first adhesive layer in the display area.

2. The display device according to claim 1, wherein the thickness of the conductive material is larger than the total of the thickness of the microcapsule and the thickness of the adhesive sheet in the display area by a range of 10 to 200 μm.

3. The display device according to claim 1, wherein the second adhesive layer is composed of a moisture-resistant resin.

4. An electronic apparatus comprising the display device according to claim 1.

* * * * *